United States Patent [19]

Depaoli et al.

[11] Patent Number: 4,824,007
[45] Date of Patent: Apr. 25, 1989

[54] METHOD AND DEVICE FOR THE ORIENTATION AND LOGITUDINAL MOVEMENT OF ROUNDED CAN BODIES IN RELATION TO A WELDING APPARATUS

[75] Inventors: Albano Depaoli, Mühlacker, Fed. Rep. of Germany; Peter Gysi, Bellikon, Switzerland

[73] Assignee: Elpatronic AG, Zug, Switzerland

[21] Appl. No.: 130,103

[22] Filed: Dec. 7, 1987

[30] Foreign Application Priority Data

Dec. 9, 1986 [CH] Switzerland .................. 04906/86

[51] Int. Cl.⁴ ............... B23K 26/04; B23K 26/08; B23K 31/06
[52] U.S. Cl. ............................... 228/102; 228/144; 228/151; 228/17.5; 228/9; 228/44.3; 219/61.3; 219/64
[58] Field of Search ........ 228/102, 103, 144, 149–151, 228/17.5, 5.1, 9, 44.3; 219/61.3, 64

[56] References Cited

U.S. PATENT DOCUMENTS 3,431,383  3/1969  Ullery, Jr. et al. ............... 228/17.5
4,577,796  3/1986  Powers et al. ..................... 228/102
4,675,496  6/1987  Toyoshima et al. .............. 228/151

FOREIGN PATENT DOCUMENTS 2507310  12/1982  France ............................. 228/102
 363535   2/1973  U.S.S.R. .......................... 228/17.5

Primary Examiner—Nicholas P. Godici
Assistant Examiner—Samuel M. Heinrich

[57] ABSTRACT

In order to hold the longitudinal edges (12, 14) of a can body (10) which are to be butt-welded together contiguous with one another on the way to a welding apparatus (52), the can body (10) is moved past a magnet (40) by means of which the longitudinal edges (12, 14) are magnetized with opposite polarity. The two poles ($N_S$, $S_N$) of the magnet (40) each have a supporting surface (42, 44) for a conveyor belt (36) which conveys can bodies (10) one behind the other from a guide member (22) to the welding apparatus (52).

8 Claims, 2 Drawing Sheets

METHOD AND DEVICE FOR THE ORIENTATION AND LOGITUDINAL MOVEMENT OF ROUNDED CAN BODIES IN RELATION TO A WELDING APPARATUS

The invention relates to a method and a device for the orientation and longitudinal movement of rounded can bodies in relation to a welding apparatus for the butt-welding of longitudinal edges of the can bodies, the longitudinal edges being moved, situated opposite one another, along a guide member upstream, in the conveying direction, of the welding apparatus.

It has been proposed (German Pat. No. 35 34 195) to convey rounded can bodies, the longitudinal edges of which are to be butt-welded to one another, through a cage-like sizing tool by which the longitudinal edges are first urged towards bearing surfaces of a blade-like guide member and then pressed directly against one another. In this case, however, it has proved difficult completely to prevent any mutual displacement of the longitudinal edges until they have been welded together. Even a slight mutual displacement in the radial direction is sufficient to make the resulting welding seem unsightly and in some circumstances even unusable. A mutual displacement of the longitudinal edges in their longitudinal direction, on the other hand, has the effect that the end edges of the can bodies are uneven as a result of which difficulties may arise in fitting can lids and bottoms.

It is therefore the object of the invention to develop further a method and a device of the type described at the beginning in such a manner that once an orientation of the edges has been achieved by means of the guide member it is reliably retained during the conveying of the can bodies from the guide member to the welding apparatus, and the longitudinal edges reach the working region of the welding apparatus bearing uniformly one against the other.

In the method described at the beginning, the problem is solved according to the invention in that, on the way from the guide member to the welding apparatus, the longitudinal edges of the can bodies are magnetized with opposite polarity and are thereby held contiguous with one another.

The magnetic forces tend to bring the longitudinal edges into mutual abutment over their whole area as soon as they are released from the guide member, and to hold them in such abutment so long as the can bodies are magnetized. The pressure with which the longitudinal edges are held together depends essentially only on the strength of the magnetic field but not, on the other hand, on the diameter of the can bodies which may fluctuate within certain limits as a result of inaccuracies in the cutting to size of blanks from which the can bodies are rolled. It is particularly important that the magnetic forces prevent any mutual longitudinal displacement of the longitudinal edges bearing against one another largely independently of the manner in which the can bodies are conveyed from the guide member to the welding apparatus.

According to a further development of the method according to the invention, the magnetization is also for the transmission of conveying forces to the can bodies.

Furthermore, the position of the longitudinal edges held contiguous with one another by the magnetization can be monitored on the way between the guide member and the welding apparatus and corrected, if necessary, by a relative movement between guide member and welding apparatus, directed transversely to the longitudinal edges. In this case, it is possible in principle to adjust either the guide member or the welding apparatus transversely to the longitudinal edges.

The magnetization of the can bodies has the additional advantage that the position of the longitudinal edges can be monitored by measuring the stray magnetic field occurring in the region of the edges during the magnetization. This monitoring can be carried out more simply than, for example, optical monitoring, although the latter may be more accurate.

A further subject of the invention is a device for carrying out the method described on a can welding machine having a sizing tool and a guide member which define a conveying axis, a welding apparatus, particularly a laser welding apparatus which has a working axis arranged transversely to the conveying axis, and a conveyor for conveying the can bodies along the conveying axis. According to the invention, such a device is further developed in that one pole of a magnet, which comprises a supporting surface for a conveyor belt of the conveyor, is disposed at each side of a plane which contains the conveying axis.

The device according to the invention, is particularly simple if a common conveyor belt, which is is disposed diametrically opposite to the welding apparatus, is associated with both poles of the magnet. Two parallel conveyor belts may, however, also be provided, each of which is associated with one of the two poles and which leave a sufficient gap for the welding free between them.

It is further advantageous if the welding apparatus is adjustable transversely to the conveying axis and its adjustment is controlled by a sensor disposed between it and the guide member.

The sensor may be a sensor responding to stray magnetic fields.

One example of embodiment of the invention is explained below, with further details with reference to diagrammatic drawings.

FIG. I shows an oblique view of a device according to the invention,

Figure 1:
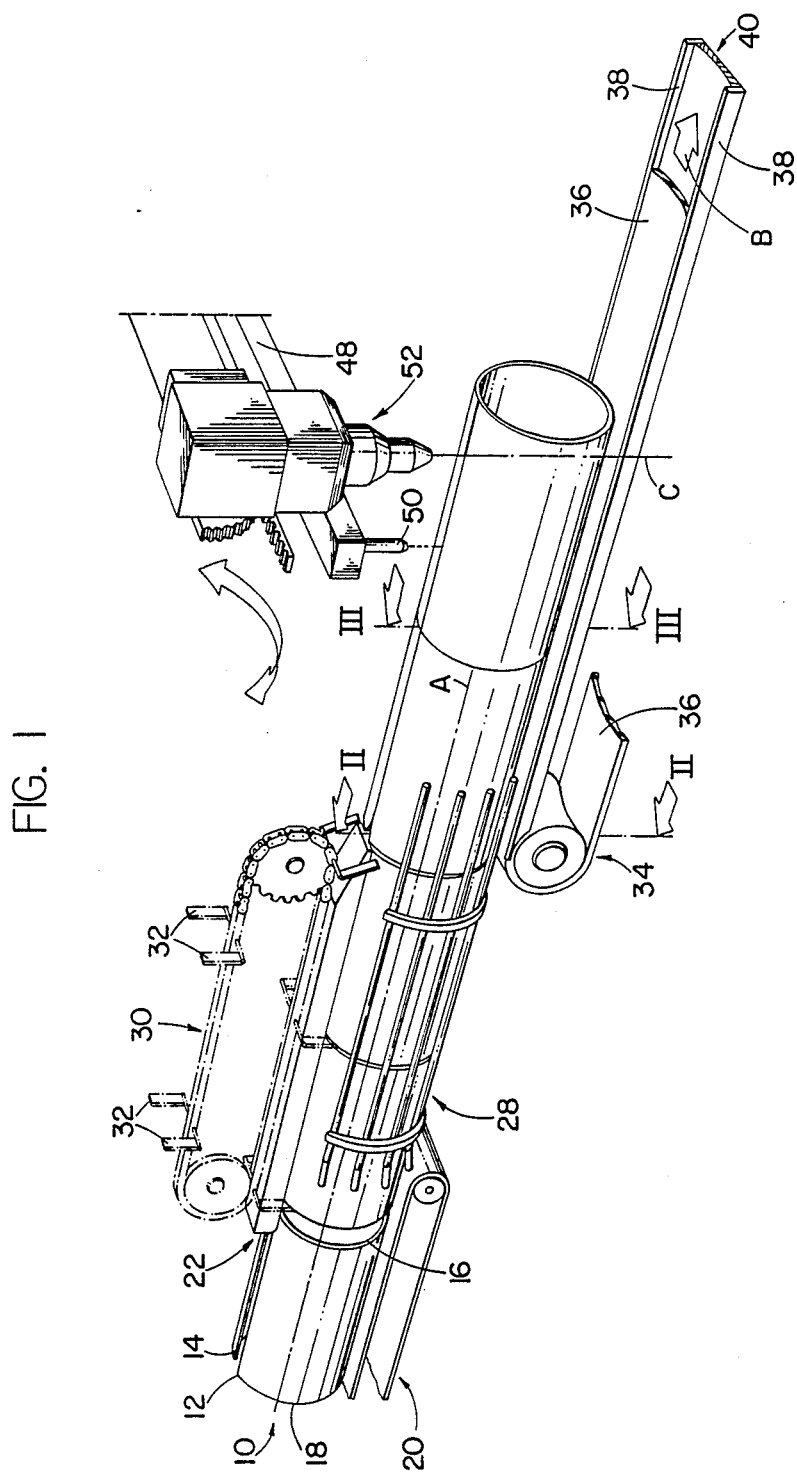
Figure 3:
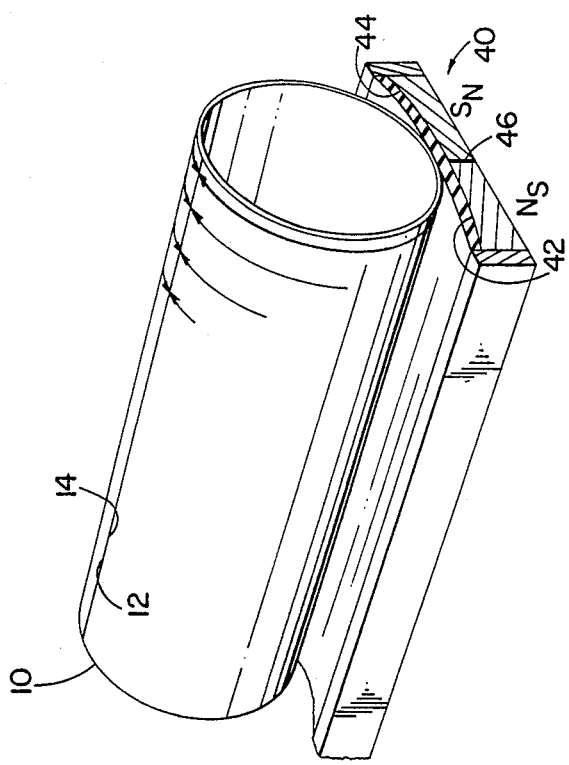
FIG. 3 shows another enlarged detail from FIG. 1, seen from the plane III—III.
Figure 2:
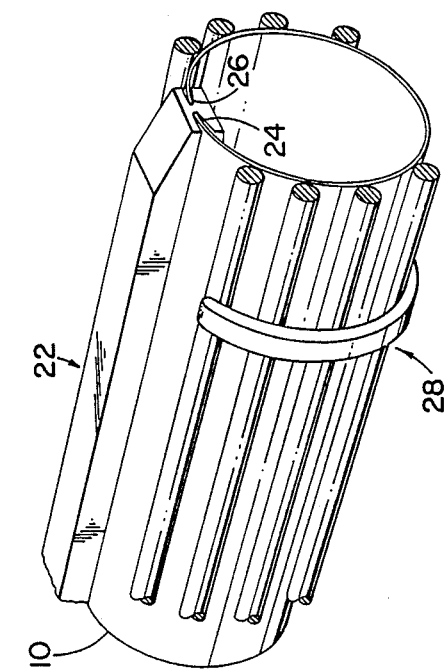
FIG. 2 shows an enlarged detail from FIG. 1, seen from the plane II—II.

The device illustrated belongs to a machine for the production of can bodies 10 with longitudinal edges 12 and 14 butt-welded together. The can bodies are rounded by an apparatus of conventional construction, not illustrated, and, as can be seen in the left-hand portion of FIG. 1, are held in readiness in a position in which their two longitudinal edges 12 and 14 are disposed at the top, a short distance apart, and their two end faces 16 and 18 each lie in a vertical plane. During each working cycle of the machine, one can body 10 is fed from this position to a guide member 22 by means of a belt conveyor 20.

The guide member 22 has the form of a rail which begins above the end of the belt conveyor 20 illustrated in FIG. 1, extends parallel to its conveying direction and comprises two lateral longitudinal grooves 24 and 26 situated horizontally opposite one another. The longitudinal edges 12 and 14 are pushed each into a respective longitudinal groove and they are guided in these grooves in such a manner that they approach one another during further forward movement.

Beginning a short distance behind the entry end of the guide member 22 is a cage-like sizing tool 28 which engages round the can body 10 captive in the longitudinal grooves 24 and 26 and which guides it in such a manner that the longitudinal edges 12 and 14 slide reliably along the bottom of the associated longitudinal groove 24 or 26 respectively. The sizing tool 28 is only illustrated diagrammatically; it may be equipped with radially resilient rollers in the usual manner. Guide member 22 and sizing tool 28 define a conveying axis A which coincides with the geometrical axis of each can body 10 during its movement, from left to right in FIG. 1.

A chain conveyor 30 is disposed above the rail-like guide member 22. This chain conveyor has pusher dogs 32 which are arranged in pairs at distances apart which correspond to the length of the can bodies 10 and of which the pairs of pusher dogs moving forwards on the lower run of the chain conveyor engage astraddle the guide member 22 and bear against the rear end face 18 of each can body 10 in order to push the body forwards.

The chain conveyor 30 ends substantially in the same plane II—II as the guide member 22. Beginning substantially in the same plane II—II is a further conveyor 34 which is disposed underneath the can bodies 10 and which, in its entry region, overlaps with the sizing tool 28 so that each individual can body 10 is still being guided by the sizing tool 28 when it arrives on this further conveyor 34.

The conveyor 34 has an endless conveyor belt 36 of non-magnetic material, for example rubber or rubber-like plastics material, the upper run of which is guided between two guide rails 38, precisely parallel to the common conveying axis A of the guide member 22 and of the cage 28. The upper run of the conveyor belt 36 lies on a magnet 40, in the example illustrated, a permanent magnet; the poles $N_S$ and $S_N$ each have a slightly concave supporting surface 42 or 44 respectively for this purpose. The two poles $N_S$ and $S_N$ are separated from one another by an intermediate layer 46 which is not a magnetic conductor.

The lines of magnetic flux originating from the pole $N_S$ largely pass through the conveyor belt 36 into the can body 10 lying thereon and continue into the sheet metal of the can body 10. Some of the magnetic flux takes a short cut via the lower portion of the can body 10 bridging the intermediate layer 46 to the magnetic pole $S_N$. But some of the magnetic flux follows the sheet metal of the can body 10 upwards and produces magnetic attraction forces between the longitudinal edges 12 and 14.

After only a short distance downstream, in the conveying direction, of the guide member 22, the attraction forces have the effect that the edges 12 and 14 bear firmly against one another and no longer separate from one another, while the can body 10 in question is being conveyed onwards on the conveyor 34. Since the magnetization is also used to transmit conveying forces to the can bodies, the forces transmitted directly from the magnet 40 to the can bodies 10 ensure that the can bodies are entrained one behind the other by the conveyor belt 36 which is moving at uniform speed in the direction of the arrow B in FIG. 1.

The speed of the conveyor belt 36 is somewhat lower than that of the chain conveyor 30; consequently the front end face 16 of the following can body bears without a gap against the rear end face 18 of a can body 10 which has left the range of action of the chain conveyor 30. In the course of this, the magnetic flux contributes to the fact that the end faces 16 and 18 are orientated in relation to one another so that the can bodies 10 situated one behind the other act like an uninterrupted tube.

Downstream of the guide member 22 in the direction of conveying, at a distance which is somewhat greater than the length of each individual can body 10, a sensor 50 is disposed on a carriage 48. In addition to the sensor 50, the carriage 48 carries a welding apparatus 52 with a vertical working axis C.

The sensor 50 controls the carriage 48 via a circuit which is not illustrated and which may be of conventional types, in such a manner that the working axis C of the welding apparatus 52 is always contiguous to the two longitudinal edges 12 and 14 which are lying against one another and which are to be welded together. The welding apparatus 52 is preferably a laser gun and the working axis C coincides with the axis of the laser beam.

Instead of a rectilinear displacement, there is also the possibility of pivoting of the welding apparatus 52 about an axis parallel to the conveying axis A; by this means it is possible to ensure that the laser beam always strikes the two contiguous longitudinal edges 12 and 14 even if these should have a position deviating from the desired position, for example as a result of fluctuations in diameter of the can body to be welded.

In the event of deviations in the lateral position of the longitudinal edges 12 and 14, the position of the stray magnetic field in the region of these longitudinal edges varies. Such changes in position of the stray field can be detected for example by Hall effect generators which form the sensor 50. Alternatively, the sensor 50 may be an optical sensor.

We claim:

1. A method for the orientation and longitudinal movement of rounded can bodies (10) in relation to a welding apparatus (52) for the butt-welding of longitudinal edges (12, 14) of the can bodies (10), the longitudinal edges (12, 14) being moved, situated opposite one another, along a guide member (22) upstream of the welding apparatus, characterized in that, on the way from the guide member (22) to the welding apparatus (52), the longitudinal edges (12, 14) of the can bodies (10) are magnetized with opposite polarity and are thereby held contiguous with one another and the magnetization is also used to transmit conveying forces to the can bodies (10).

2. A method as claimed in claim 1, characterized in that the position of the longitudinal edges (12, 14) held contiguous with one another by the magnetization is monitored on the way between the guide member (22) and the welding apparatus (52) and is corrected, if necessary, by a relative movement between guide member (22) and welding apparatus (52) in a direction transverse to the longitudinal edges (12, 14).

3. A method as claimed in claim 2, characterized in that the position of the longitudinal edges (12, 14) is monitored by measuring the stray magnetic field developing in the region of the longitudinal edges (12, 14) during the magnetization.

4. A device for orienting and longitudinally moving rounded can bodies for butt-welding the longitudinal edges (12, 14) of the can bodies in a can welding machine having a sizing tool (28) and a guide member (22) which define a conveying axis (A), a welding apparatus (52) which has a working axis (C) disposed transversely to the conveying axis (A), and a conveyor (34) for conveying the can bodies (10) along the conveying axis (A), characterized in that disposed at each side of a plane which contains the conveying axis (A) are opposite poles ($N_S$, $S_N$) of a magnet (40) which comprises a supporting surface (42, 44) for a conveyor belt (36) of the conveyor (34).

5. A device as claimed in claim 4, characterized in that associated with said opposite poles ($N_S$, $S_N$) of the magnet (40) is a common conveyor belt (36) which is disposed diametrically opposite the welding apparatus (52).

6. A device as claimed in claim 4 characterized in that the welding apparatus (52) is adjustable laterally of the conveying axis (A) and its adjustment is controlled by a sensor (50) disposed between it and the guide member (22).

7. A device as claimed in claim 6, characterized in that the sensor (50) is a sensor responding to stray magnetic fields.

8. A device as claimed in claim 4 wherein said welding apparatus is a laser welding apparatus.

* * * * *